(12) United States Patent
Rye et al.

(10) Patent No.: US 6,397,288 B1
(45) Date of Patent: May 28, 2002

(54) RF PC INTERFACE

(75) Inventors: David John Rye, New City, NY (US); James Phillips, Bellevue, WA (US); Lesley Alan Leech, Kowloon (HK)

(73) Assignee: Xid Wireless Technology INC, Seattle, WA (US)

( * ) Notice: Subject to any disclaimer, the term of this patent is extended or adjusted under 35 U.S.C. 154(b) by 0 days.

(21) Appl. No.: 09/390,540

(22) Filed: Sep. 3, 1999

(51) Int. Cl.$^7$ .............................................. G06F 13/00
(52) U.S. Cl. ........................ 710/305; 710/62; 710/300
(58) Field of Search ................................ 710/2, 62, 64, 710/65, 69–74, 300, 305, 315; 361/686

(56) References Cited

U.S. PATENT DOCUMENTS

| | | | | |
|---|---|---|---|---|
| 4,556,866 A | * | 12/1985 | Gorecki | 329/300 |
| 5,550,865 A | * | 8/1996 | Cripps | 375/295 |
| 5,565,855 A | * | 10/1996 | Knibbe | 340/3.44 |
| 5,896,351 A | * | 4/1999 | Misaizu et al. | 369/30.04 |
| 5,938,757 A | * | 8/1999 | Bertsch | 340/3.1 |
| 6,151,646 A | * | 11/2000 | Watts et al. | 710/38 |
| 6,163,711 A | * | 12/2000 | Juntunen et al. | 455/557 |

\* cited by examiner

*Primary Examiner*—Xuan M. Thai
(74) *Attorney, Agent, or Firm*—Marvin N. Gordon

(57) ABSTRACT

An rf PC interface transmits binary coded radio-frequency (rf) signals which are binary coded in accordance with software resident in a PC. The interface is plugged into a serial port of the PC and includes a pass-through port and an rf modulator. Also disclosed is an rf transceiver which receives and demodulates addressed coded rf signals, which are then combined with the appropriate audiovisual product remote control signals to drive an IR transmitter to produce remote control signals for the addressed audiovisual product.

9 Claims, 3 Drawing Sheets

RF PC INTERFACE

BACKGROUND OF THE INVENTION

The present invention relates generally to an improved interface for use in connecting an external unit to an input/output (I/O) port of a personal computer (PC), and more particularly to a computer interface adapted to be plugged into a serial port of a PC, and which has the ability to transmit binary coded rf signals based on digital commands received from the PC.

There exist numerous applications in which an external unit is connected to the input/output (e.g. serial) port of a PC to receive and input binary or digital data to and from the PC. One such application is in an automated appliance control system such as the one disclosed in co-pending application Ser. No. 09/364,714,) the contents of which are incorporated herein by reference. In that system, a control interface unit receives digital commands from a PC over a RS-232 connector. The control interface unit, in response, produces rf binary data burst address and function control signals, which are applied to an ac power line for transmission to a plurality of control modules. An electrical appliance, lamp, or any other electrically operated device, is connected to one of the modules and is turned on or off in response to the function control signal received at its associated control module. Alternatively, the control unit may transmit those address and function control signals over the air to an rf transceiver, which retransmits and applies those signals onto the a.c. power line.

The programming of an appliance control system of this type, is, however, only one of the numerous potential applications of a PC. Other typical uses of a PC include the operation of a printer or a scanner, to which a connection from the PC is typically made at a serial or parallel input/output port of the PC. The number of such ports on a PC is, however, limited. The typical home PC includes only two or three I/O ports, so that choices must often be made regarding the use of the available input/output ports. Stated differently, if all of the PC I/O ports are in use at a given time, and the user wishes to commence an additional device to the PC, the user must disconnect one of the already connected output devices from its port, so that that port may be used to connect another output device, such as the appliance control unit referred to above. Thus, any time the PC is connected to any particular external device the number of available I/O ports in that PC is reduced by one.

SUMMARY OF THE INVENTION

It is an object of the present invention to provide an interface for I/O use with a PC which allows a greater number of output devices to be connected to the limited number of I/O ports in the PC.

It is a further object of the invention to provide a computer interface which is adapted to be connected to a PC I/O port to receive digital signals, and which converts this signal to corresponding rf data signals.

To this end, the computer interface of the invention includes a standard male connector and a female connector of the type that is typically inserted or plugged into the serial port of a PC. The male connector of the interface allows the PC serial I/O port to be also converted to an external device, such as a printer, which would normally be plugged directly into that serial port. An rf pulse modulator receives its operating power from the PC serial port and binary signals from the PC and modulates those signals onto an rf carrier.

The computer interface of the invention reformats and transmits binary data or commands from the PC. It also passes binary signals from the PC to an external device that is plugged into the other connector of the interface so that the interface is transparent to that external device. The serial I/O port of the PC, in which the interface of the invention is plugged, can thus be used to supply data to or receive data from another device, so that use of that port with the interface is not lost. The interface can be used to transmit binary coded r.f. address and function control signals derived from software running in the PC over-the-air to a transceiver located at a remote appliance control module.

An additional aspect of the PC rf interface of the invention resides in its use with a multi-unit remote control, which is an improvement over the remote control unit disclosed in U.S. Pat. No. 4,809,359. In the present invention, the binary coded rf control and address signals transmitted by the rf PC interface are received and demodulated to derive a sequence of binary coded remote control and address signals. Those signals are processed to further code them in accordance with the brand, e.g. Sony or Zenith, of audiovisual product, e.g. television or VCR, that is to be remotely controlled by the coded control signals.

To this end, a memory for IR code library that contains the universal remote control codes for all commercial brands of audio visual products, and a look up table that stores the remote control codes for all audio visual products in the user's home are connected to a processor, in which the product codes are combined with the received binary coded control signals. The thus processed and modified binary coded address and control signal s are applied to an IR transmitting device, e.g. an LED, which transmits correspondingly coded IR control and address signals adapted to operate only with the selected, i.e. addressed, audiovisual product.

BRIEF DESCRIPTION OF THE DRAWINGS

To the accomplishment of the above and such further objects as may appear, the present invention is directed to a radio frequency PC interface substantially as defined in the appended claims and as described in the following detailed specification as considered with the accompanying drawings in which:

DESCRIPTION OF THE PREFERRED EMBODIMENT

Figure 1:
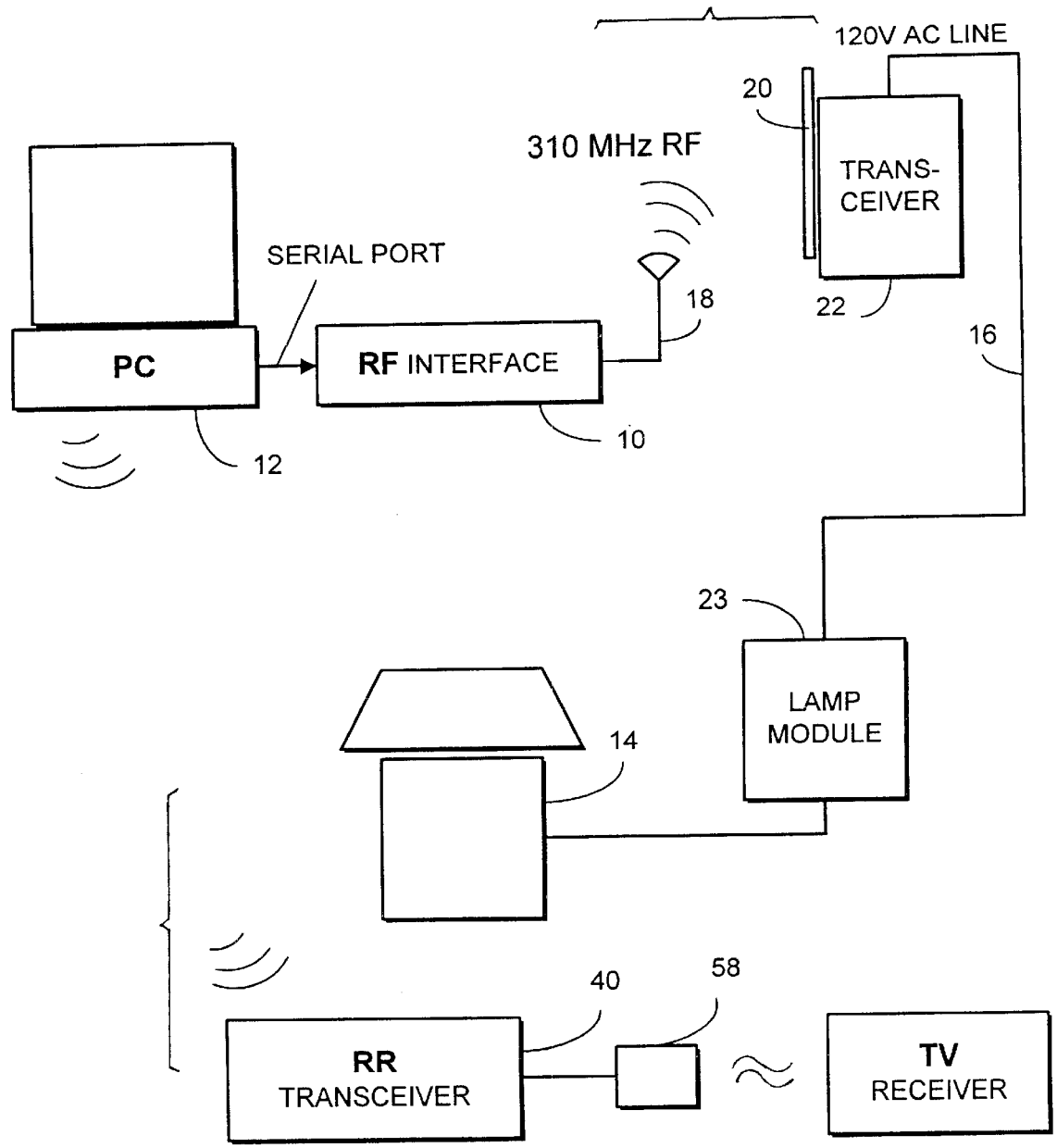
FIG. 1 is a schematic diagram illustrating a possible application of the rf computer interface of the invention.

Referring to FIG. 1, there is shown an appliance control system of the type shown in co-pending application Ser. No. 09/364,714 in which the rf computer interface 10 of the invention may be used to advantage. As therein shown, interface 10 is coupled to the serial port of a conventional personal computer (PC) 12 programmed, as in a preferred embodiment of the invention, to generate appliance address and function command signals that, as described in greater detail in the aforesaid pending application, automatically control the operation of appliances such as lamp 14 connected at various locations to an ac power line 16. To this end, as described in greater detail below, the binary command signals from the PC are reformatted in the interface 10, and are modulated in the interface onto an rf carrier, such as at a frequency of 310 mHz.

The thus-modulated rf coded signals are applied to an interface antenna 18 which transmits those signals over-the-air. The transmitted rf coded signals are received at a transceiver antenna 20 connected to a transceiver 22, which, in turn, as shown, is connected to, and thus applies, the received coded rf command signals to the ac power line 16. As also described in said co-pending application, the coded rf command signals, which include module address signals and function (e.g., on-off, dim) signals, are also directly applied to the ac power line 16 to which a plurality of modules, such as a lamp module 23 are connected. When module 23, which is connected to lamp 14, receives a coded rf command signal containing its unique coded address, it performs the associated function on lamp 14, e.g., it turns the lamp on or off.

Figure 2:
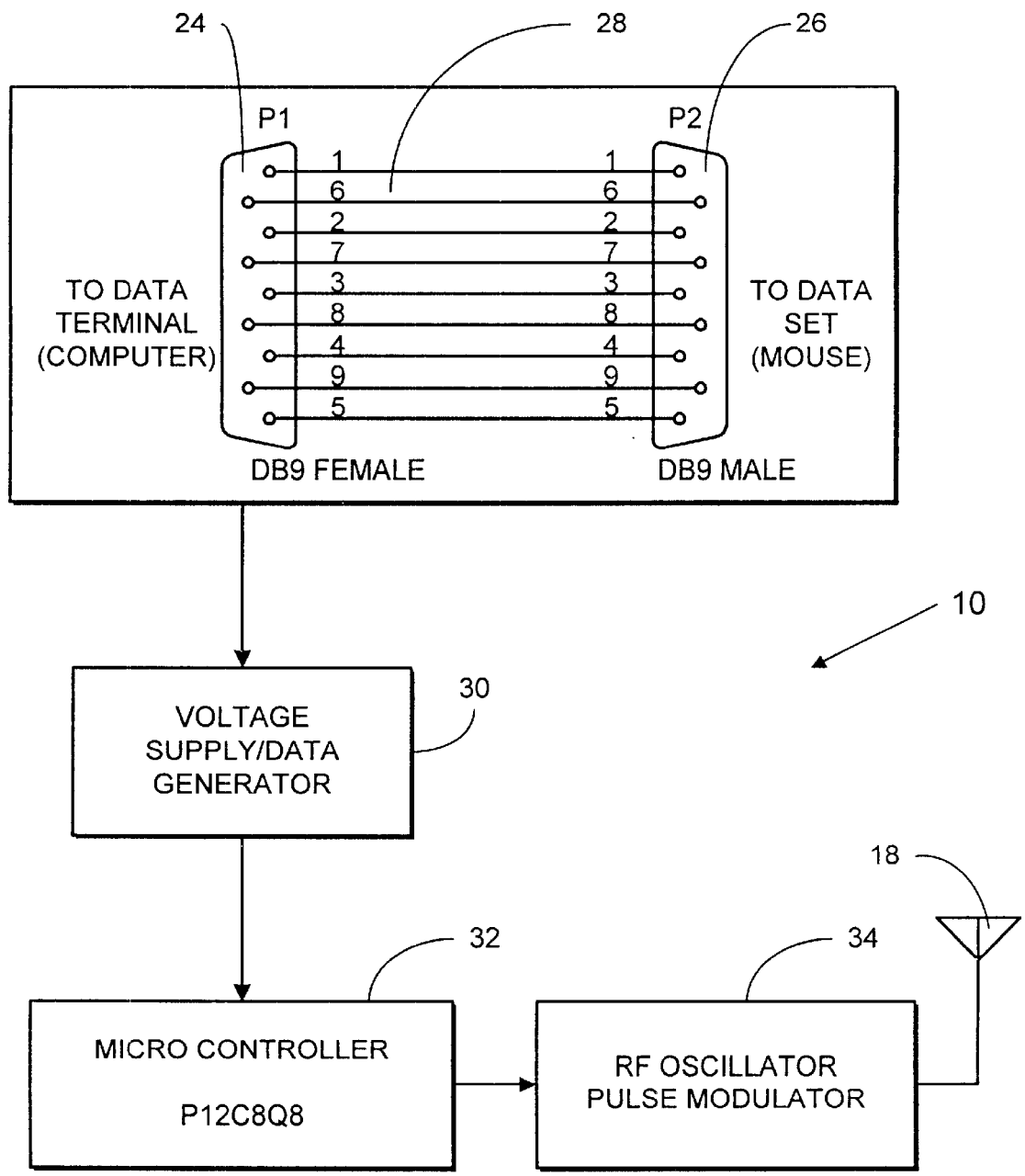
FIG. 2 is a diagram of the rf computer interface of the invention.

As shown in FIG. 2, the interface unit 10 of the invention includes a first connector 24 and a second connector 26. In an exemplary embodiment of the invention, connectors 24, 26 are each standard DB9 connectors, connector 24 being a female connector since the serial port of a PC into which connector 24 is plugged is typically a male connector; connector 26 in this embodiment is a male connector. An RS-232 pass-through 9-line parallel bus 28 interconnects connectors 24 and 26. As shown schematically in FIG. 2, a supply voltage and data generator circuit 30 is connected to the appropriate lines of bus 28. The output of data generator circuit 30 is coupled to an input of a microcontroller 32, the output of which is connected to the input of an r.f. oscillator and pulse modulator 34.

In a presently contemplated use of the interface of the invention, illustrated in FIG. 1, the connector 24 of interface 10 is plugged into the serial port of the PC 12. The interface 10 receives its operating supply voltage from one line of bus 28 and the appliance binary coded command signals from another line of the bus. Those binary signals are, in a known matter not further described herein, formatted in the data generator 30 and microcontroller 32 to the desired binary format such as for use in an appliance control system, as described in greater detail in said aforesaid copending application.

The reformatted data pulses are applied to the modulator portion of oscillator/modulator 36 in which the binary coded command signals are modulated onto the rf carrier generated by the rf oscillator in oscillator/modulator 34, which, as noted above, may be of a frequency in the order of 310 mHz. The binary coded modulated rf signal produced in modulator 34 is applied to the rf antenna 18, which, as described previously with respect to FIG. 1, transmits those signals over-the-air to the power line transceiver 22. As described in greater detail in said copending application, the selection of the coded address and function signals supplied from the PC to the interface 10 may be made by the user through the operation of a mouse that is clicked onto an image of a remote control unit that is displayed, by means of special software resident in the PC, on the PC monitor. In this manner, the user may click onto the correspondingly numbered "buttons" on the virtual remote control unit to cause the suitably programmed PC to develop the appropriate binary command signals that, when applied via interface 10 to the appliance control module, perform the desired appliance control operation.

The rf PC interface 10 of the invention is thus capable of being connected to an output port of a PC and of transmitting radio-frequency binary coded signals, based on binary signals it receives from the PC, over the air to a remote transceiver. Another input or output device (not shown) may be plugged into the male connector 26 of interface 10 and can receive or transmit R3-232 binary signals from or to connector 26 over selected lines of parallel bus 28.

The interface 10 of the invention can also pass binary data or signals from the PC to whatever additional device is plugged into the interface, and is thus transparent to that device. That is, the serial port of the PC into which the female connector 24 of the interface is plugged to generate, for example, the rf coded signals, can also be connected through the interface to another output or input device.

Figure 3:
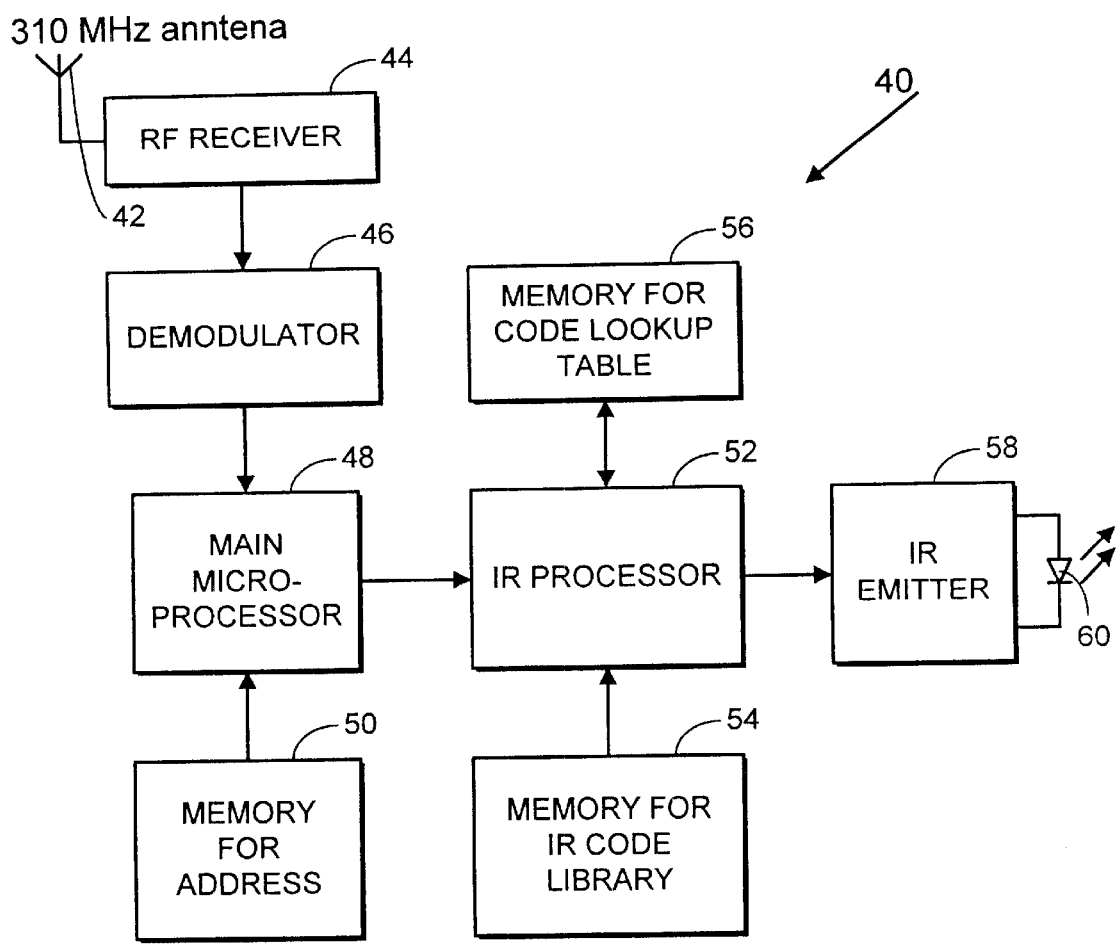
FIG. 3 is a schematic block diagram of an rf/IR transreceiver as used with the rf computer interface in accordance with an aspect of the invention.

FIG. 3 illustrates schematically a transceiver, generally designated 40, which may, as also indicated in FIG. 1, be used to advantage with the rf PC interface 10 described above to control remotely the operation of audiovisual products, such as a television receiver or VCR, which operate in response to infrared (IR) coded control signals. The transceiver is particularly useful in locations in which there are more than one TV or VCR.

To this end, the transceiver 40 receives binary coded rf signals from the PC interface 10, which identify the address of the audiovisual product to be controlled, e.g. the TV receiver or VCR, and the control operation that is to be performed on that product in response to that signal, e.g., turn on or raise or lower the volume. In overview, those signals are converted in the transceiver to corresponding binary coded IR signals, which are then transmitted over-the-air to, e.g. a television receiver, to control its operation.

Specifically, as shown in FIG. 3, the transceiver 40 includes an rf antenna 42 connected to the input of an rf receiver 44. The output of receiver 44 is coupled to one input of a demodulator 46, the output of which is applied to one input of a main microprocessor 48. An address memory 50 is connected to another input of a microprocessor 48. Memory 50 stores the binary addresses of the various audio visual products, such as TVs and VCRs, whose operations, e.g. on-off, volume control, channel up or down, are to be remotely controlled in response to the binary coded rf signals received from interface 10 at rf antenna 42.

The output of microprocessor 48 is applied to one input of an IR processor 52, which receives at another input the contents of a universal IR code library memory 54, which contains the remote control codes for all manufacturers of commercially available home audiovisual products, e.g. Sony or Zenith. For example, if the product identified as TV 1 is a Sony product and a second TV receiver in the home TV 2 is a Zenith product, memory 56 would store the Sony remote control code for TV 1 and the Zenith remote control code for TV 2. The remote control codes in memory 56, which are derived from code library memory 54 through microprocessor 52, may be augmented or otherwise modified from time to time by the user when a new audiovisual product is acquired or an old product is discarded. The output of IR processor 52 is applied to an IR emitter 58, which provides binary coded drive signals to an LED 60, which, in response, transmits correspondingly coded IR binary control signals to the selected or addressed audiovisual product. In an otherwise known manner, the audiovisual responds to the received IR signal which contains its unique product remote control code.

In the operation of the transceiver of FIG. 3, the binary coded rf control and address signals are received at receiver 44 and demodulated in demodulator 46. The output binary signals of the latter are applied to a microprocessor 48, in which the binary address portion of the signal is compared to product address codes obtained from the address memory 50. In the event the received address matches one of the stored addresses, a signal is applied to IR processor 52, which, in response, identifies both the product to be controlled and the control operation that is to be performed on that product.

Processor 52 converts the input control signal so that it is compatible with the operating binary code for the selected device whose IR code is obtained from look-up table memory 56. That is, if the control operation that is to be performed is to change (raise or lower)the channel of a Sony TV receiver, the Sony channel control code is selected in processor 52 and is then applied to IR emitter 58 to, in turn, cause LED 60 to transmit to the addressed Sony TV, in the example given, the selected control signal in the form of a Sony-compatible IR binary signal.

It will be appreciated from the foregoing discussion of a presently preferred embodiment that the PC interface of the present invention allows for the convenient and economic use of a PC to transmit binary coded control signals developed in the PC for control and operation of a remote device. It will be further appreciated that whereas the PC interface of the present invention has been described hereinabove with respect to that presently preferred embodiment, modifications therein and thereto may be made without necessarily departing from the spirit and scope of the invention.

What is claimed is:

1. An interface for connection to an I/O port of a computer, said interface comprising a first connector adapted to be plugged into the computer I/O, a second connector, a multi-conductor bus connecting said first connector to said second connector, an rf pulse modulator connected to said first connector for modulating an rf carrier in accord with the binary signals derived from the computer of said first connector, and means coupled to said pulse modulator for transmitting the binary coded rf signals over the air to a remote receiver.

2. The interface of said claim 1, in which said first connector is a female connector and said second connector is a male connector.

3. The interface of claim 1, further comprising means interposed intermediate said first connector and said pulse modulate for formatting the binary signals from the computer.

4. In combination with the interface of claim 1, for receiving and demodulating the binary coded rf signals, and processing means operatively connected to said demodulating means for modifying the demodulated binary coded signals in accordance with the type of audiovisual product the operation of which is to be controlled.

5. The combination of claim 4, in which said processing means includes a first memory storing a plurality of IR control codes for a corresponding plurality of brands of audiovisual products, the operation of which are to be controlled by said binary coded control signals.

6. The combination of claim 5, in which said processing means further comprises a second memory for storing the universal IR remote control codes for commercial audiovisual products and a first processor having input respectively operatively connected to said first and second memories.

7. The combination of claim 6, further comprising IR transmitting means operatively connected to the output of said first processor.

8. The combination of claim 5, further comprising a third memory for storing the addresses of the several audiovisual products to be remotely controlled and a second processor connected to the output of said demodulating means and to said third memory, the output of said second processor being applied to an input of said first processor.

9. The combination of claim 7, further comprising a third memory for storing the addresses of the several audiovisual products to be remotely controlled and a second processor connected to the output of said demodulating means and to said third memory, the output of said second processor being applied to an input of said first processor.

* * * * *

UNITED STATES PATENT AND TRADEMARK OFFICE
CERTIFICATE OF CORRECTION

PATENT NO. : 6,397,288 B1
DATED : May 28, 2002
INVENTOR(S) : David John Rye

It is certified that error appears in the above-identified patent and that said Letters Patent is hereby corrected as shown below:

<u>Title page,</u>
Item [73], correct the name of the Assignee to -- X10 Wireless Technology, Inc. --

Signed and Sealed this

Nineteenth Day of November, 2002

*Attest:*

*Attesting Officer*

JAMES E. ROGAN
*Director of the United States Patent and Trademark Office*